United States Patent [19]
Criswell

[11] Patent Number: 4,834,324
[45] Date of Patent: May 30, 1989

[54] MULTICONFIGURATION REUSABLE SPACE TRANSPORTATION SYSTEM

[76] Inventor: David R. Criswell, 4003 Camino Lindo, San Diego, Calif. 92122

[21] Appl. No.: 883,979

[22] Filed: Jul. 10, 1986

Related U.S. Application Data

[63] Continuation-in-part of Ser. No. 548,949, Nov. 7, 1983, abandoned.

[51] Int. Cl.⁴ .................................................. B64G 1/14
[52] U.S. Cl. .................................... 244/160; 244/2; 244/172
[58] Field of Search ............... 244/160, 161, 162, 163, 244/158 R, 45 R, 91, 45 A, 46, 49, 172

[56] References Cited

U.S. PATENT DOCUMENTS

| | | | |
|---|---|---|---|
| 3,202,381 | 8/1965 | Wuenscher | 244/160 |
| 3,369,771 | 2/1968 | Walley et al. | 244/162 |
| 3,405,891 | 10/1968 | Jacquarf et al. | 244/46 |
| 3,702,688 | 11/1972 | Faget | 244/162 |
| 3,881,671 | 5/1975 | Bouchnik | 244/46 |
| 3,884,435 | 5/1975 | Croy et al. | 244/46 |
| 4,451,017 | 5/1984 | Marshall | 244/172 |

OTHER PUBLICATIONS

Salkeld, "Single-Stage Shuttles for Ground Launch and Air Launch", Astronautics Aeronautics, Mar. 1974, pp. 52-63.
NASA Contractor Report No. 66685 "A Study to Determine the Weight and Performance Characteristics of Variable Geometry Spacecraft" vol. 1–Summary GDC-DCB68-012, 12 Jul. 1968. Prepared by Ken S. Coward.
NASA CR-946 "Dynamic Stability of Space Vehicles" vol. XII–"Reentry Vehicle Landing Ability and Control" by B.J. Kuchta, Issued 1968, pp. 43, 45.
NASA CR-1545 "A Study to Determine the Flight Characteristics and Handling Qualities of Variable Geometry Spacecraft"–vol. 1 High L/D Concept With Single Pivot, Two Position Skewed Wing by B.J. Kuchta dated 1969, p. 35.
Boeing Aerospace Company (Jul. 1983), "Shuttle Derived Cargo Launch Vehicle Concept Definition Study": Study Extension (Final Report), NAS8-34599, pp. 83, 89, 94 to 96.

*Primary Examiner*—Galen Barefoot
*Attorney, Agent, or Firm*—Brown, Martin, Haller & Meador

[57] ABSTRACT

A space transporation system comprises several different modular units usable in a plurality of different configurations for different payloads and space missions. The units include a first stage unit for providing primary propulsive force during launch, a payload carrying unit, which may be an orbital vehicle or simple payload canister, and an auxiliary propulsion unit for providing additional power either during launch or space flight. The units are all demountably securable together, and preferably all include aerodymanic devices such as fixed or swing wings for a controlled return to Earth. The first stage unit can act either as a single-stage-to-orbit vehicle carrying internal or external payload, or as the first stage of a multiple stage launch configuration including a payload unit and auxiliary propulsion units.

38 Claims, 5 Drawing Sheets

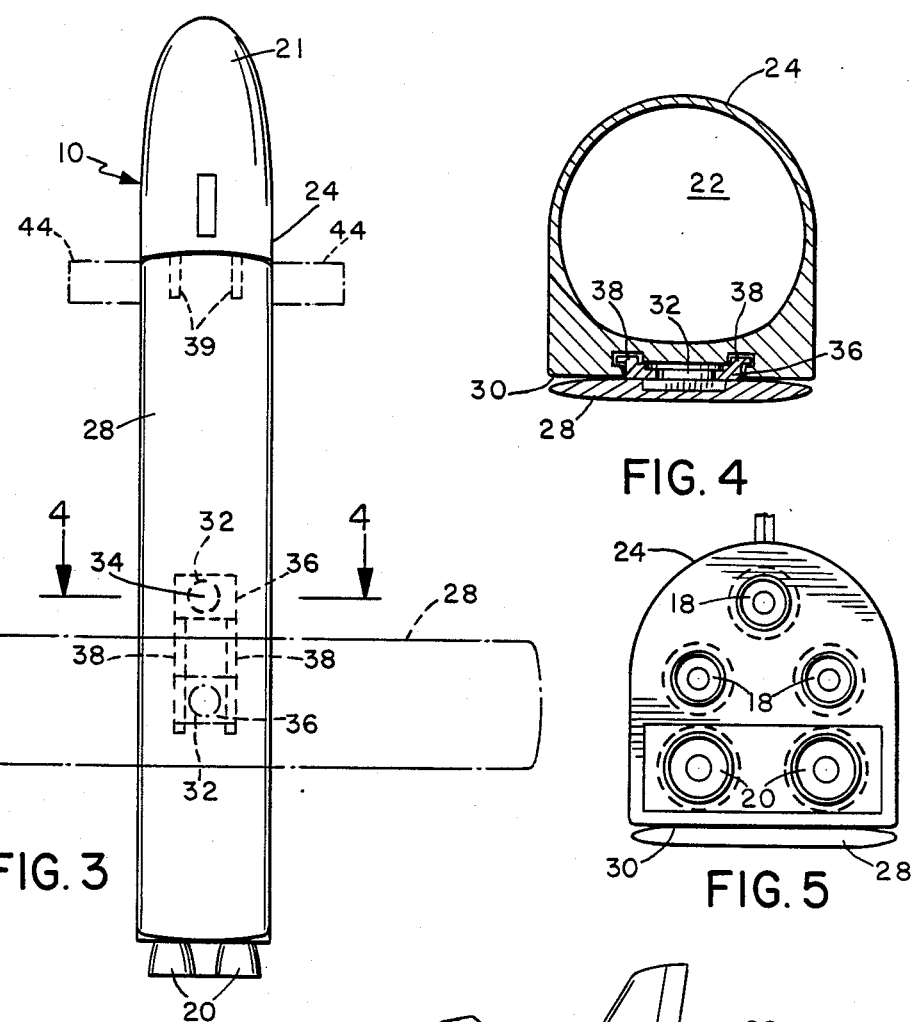
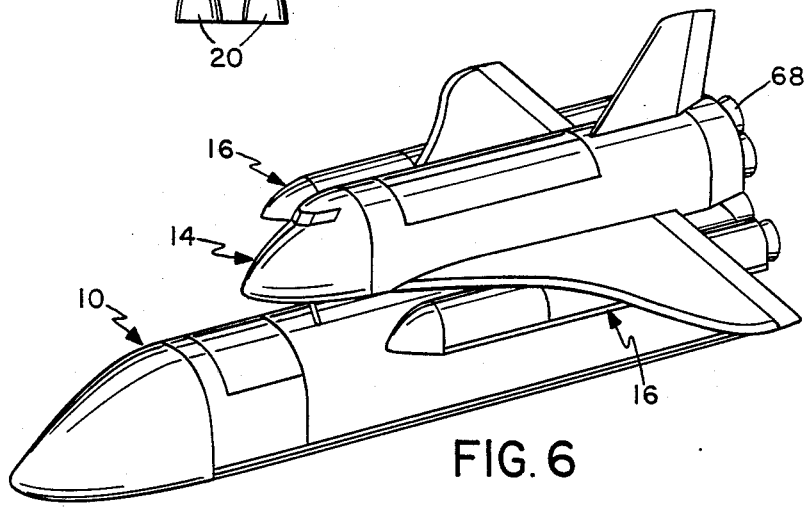

MULTICONFIGURATION REUSABLE SPACE TRANSPORTATION SYSTEM

This is a continuation-in-part of application Ser. No. 548,949 of the same Applicant filed Nov. 7, 1983, now abandoned.

TECHNICAL FIELD

The present invention relates to systems and methods for launching vehicles into outer space. More particularly, the present invention relates to systems having reuseable propulsive devices in combination with a space shuttle-like orbital vehicle or other payload-carrying vehicle.

BACKGROUND ART

The space age is barely two decades old, but the steps taken during that time have created unparallelled opportunities for the exploration and use of outer space. The space shuttle has been a step which has greatly facilitated this opportunity.

The space shuttle is a versatile vehicle having the essential characteristics of a spacecraft; yet is, in some respects, similar to an aircraft. The shuttle ascends into outer space with the assistance of rockets just as does the conventional spacecraft and descends from outer space, in a manner reminiscent of the landing of an aircraft, by gliding through the atmosphere and landing on a runway. The development of the shuttle is a significant achievement because it marks the advent of a rudimentary space transportation system. The system is expected to enable man and cargo to "shuttle" routinely to and from outer space, thereby making it possible to service, repair and resupply spacecraft, to build larger structures, such as industries, and eventually to construct settlements in outer space.

In a technical sense, the space shuttle is made up of an orbiter containing the shuttle main engines, an external tank containing the ascent propellant used by the orbiter's main engines, and two solid rocket boosters. The orbiter and the solid rocket boosters are reuseable, while the external tank is expendable on each launch. At launch, the two solid rockets and the orbiter's three liquid rocket engines ignite and burn simultaneously. The orbiter, with its crew and payload, remains in orbit to carry out a mission, normally for about seven days, but when required for as long as thirty days. When the mission is completed, the orbiter returns to Earth and lands like an airplane.

While the space shuttle marks a major step forward in the development of outer space, there are a number of problems which prevent the most effective, economical and efficient method of operating such a shuttle system. Heretofore, the prior art shows little effort to refine the space shuttle to provide greater flexibility.

One of the main problems with the space shuttle is that the orbiter, the spacecraft which looks like a Delta-winged airplane about the size of a DC-9 jetliner, must attach to an external tank and systems burden and also contain three liquid rocket engines and their associated systems. The fuel container, residual fuels at termination of the primary burn, and the rocket engines add a considerable amount of mass to the total going into or approaching orbit.

Furthermore, and even more importantly, the engines and the fuel arrangement minimize the amount of cargo space within the orbiter. This means that smaller and lighter payloads are required. Although the orbiter can deliver up to 25 tons of internal payload to orbit, the internal payload is only 1/7 of the total mass placed into orbit.

Another problem with the shuttle is the fact that the external tank for the three main engines is jettisoned in flight. Since the cost of each of these tanks is considerable, and the manufacturing capacity limited, it would appear to be desirable to avoid destruction of this tank on every flight of the space shuttle. Also, the effective use of the space shuttle orbiter is limited by the fact that it must carry this large tank almost into Earth Orbit with it.

Space shuttle orbiters contain both the payload bay and the main engines. Since they are both expensive and complex to build, there will normally be relatively few orbiters in operation at any one time. Transport to space is limited when orbiters are inoperative for maintenance or while they are in orbit. Thus, for example, orbiters cannot be used for long duration manned space missions without severely restricting launch capacity. They must be brought back to earth quickly to support launch operations. This constrains in-orbit research and could critically limit the delivery and assembly of space station or other major space projects.

These and other problems are currently being encountered by the space shuttle. In times when money was unlimited for the space program, it may have been unnecessary to exercise efficiency and economy with the projected operation of such a shuttle program. But today, in view of the limited budgets for space exploration, and the need for private enterprise space exploration, the efficiency and economy problems associated with space shuttle operation and further development are impossible to ignore.

SUMMARY OF THE INVENTION

The present invention relates to a multi-configuration space transportation system for selectively transporting different mass payloads into space, the system comprising a plurality of different modules which are preferably all reusable and which can be releasably secured together in a number of different possible configurations.

The modules include a first stage unit containing a primary propulsion device for providing sufficient thrust to propel payloads up to a predetermined mass into or close to orbit, a payload unit for containing payloads, and at least one second stage or auxiliary unit for selectably securing to the rest of the system, including a secondary propulsion device for providing additional thrust for propelling larger mass payloads into orbit or for boosting payloads into deep space. Each of the units can be secured alone to any of the other units, and several units of the same type may be used in selected launch configurations. The payload unit may comprise a simple, unpowered payload canister or pod secured externally or internally to the first stage unit, or may comprise a orbital vehicle for manned orbit including cargo space and orbital maneuvering devices or engines. The second stage units are booster devices or rockets of much smaller dimensions than the first stage units which provide the primary propulsive power.

The first stage unit preferably includes cargo space and is usable as a single-stage-to-orbit vehicle as well as part of various multiple stage configurations. The unit preferably includes an aerodynamic assembly for guiding and controlling the unit during fly back and horizontal landing on Earth. The aerodynamic assembly preferably comprises a wing pivotally mounted to the unit for pivoting between a position aligned with the longitudinal axis of the unit during launch and a position perpendicular to the longitudinal axis for guided flight. The pivotal mounting may be fixed or slidable along the longitudinal axis of the unit for increased aerodynamic control with variable payload masses. In a preferred embodiment, the wing has rotatable rudders which can be rotated into a position perpendicular to the wing during descent of the unit, and the unit also has retractable canard which can be extended for flight and landing.

The first stage unit in the preferred embodiment of the invention is in the form of a fuel tank of a type similar to the present space shuttle external tank and incorporating liquid fuel engines. The unit has various attachment points for selectively securing it to a payload canister, orbital vehicle, secondary propulsion units, or to other first stage units for increased payload capacity. The attachment points in the preferred embodiment will be similar to those currently provided in a standard space shuttle launch system. The unit will preferably also have its own internal cargo or payload space, and may be arranged for manned or unmanned flight.

In the preferred embodiment the first stage unit has three main liquid fuel engines, which may be of equivalent power to the currently used space shuttle main engines, as well as two to four hydrocarbon or hydrocarbon-oxygen auxiliary engines, all located at the aft end of the first stage unit. The auxiliary engines may be of a similar type to the Fl engines used on Saturn V. The fore end contains the liquid propellants tanks. Other fuels may be used to provide the required propulsive power in alternative embodiment.

With this arrangement, an orbital vehicle of a similar type to the current shuttle orbiter but without the heavy mass and high volume shuttle main engines can be boosted into space. The orbital vehicle can separate from the first stage unit at any time and the first stage unit can then be returned to Earth and reused when necessary. Thus the orbital vehicle can remain in space for longer periods and will have greater payload capacity since the shuttle main engines are eliminated from the vehicle. The vehicle will have increased OMS (orbital maneuvering system) propellant over standard space shuttle orbiters and a longer payload bay, allowing a greater volume payload to be transported into space.

For increased payloads and deep space transportation, a secondary or auxiliary propulsion unit may be used. This may be in the form of solid fuel booster rockets secured to the first stage unit, or in the form of external Centaurs or wing rockets which may be attached either to the first stage unit or to an orbital vehicle launched by the first stage unit. The wing tanks may be hydrogen and oxygen rockets or rockets containing any suitable propellant, and preferably include fly-back devices for guided return to Earth when their fuel supply is exhausted or when they have propelled a payload or vehicle to the desired orbit. The fly-back devices may be in the form of pivotal wings as in the first stage unit.

Thus, one possible configuration of the system of this invention comprises a single first stage unit incorporating a payload for launching into orbit. In this case the first stage unit may include either an internal payload space or external payload pods secured to the tank.

Another configuration would consist of a first stage unit demountably attached to a modified orbital vehicle, for launching a manned flight into space. The orbital vehicle may have auxiliary propulsion units in the form of wing tanks or rockets releasably secured to its wings. Fuel connections may be provided between the first stage fuel tank and the wing tanks during launch. The first stage unit will boost the system close to orbit and will then separate and fly back to the launch site. The wing tanks or external rockets would then take the payload on into orbit. The propellant may be transferable from one external rocket to the other. The auxiliary units could be returned to Earth for reuse once empty.

Another option is a combination of the first stage vehicle with suitable auxiliary devices, for example solid rocket boosters of the type currently used with the shuttle system, or auxiliary external booster rockets having a suitable propellant for enabling the first stage vehicle to accommodate heavier payloads. In a modified arrangement, two or more first stage units could be arranged in cylindrical, parallel burn configurations by providing suitable propellant cross-feeds as is currently done in the space shuttle system. A multiple first stage system of this type could be used with additional boosters or external units for additional propulsive force, and could be operated as a multi-stage vehicle to boost very large payloads. Payloads or payload canisters could be suitably externally attached to the first stage units, or carried internally in suitable payload compartments. In an alternative arrangement for launching a large payload canister, several cross-fed, first stage units may be clustered around the canister and fired in step rocket fashion to launch the canister into orbit.

Thus the proposed modular, multi-vehicle space transportation system is relatively simple, flexible, and allows various payload weights to be transported into orbit or deep space with suitable choice of units to be releasably secured together. Instead of specially designing an entire new rocket or propulsion system for each new payload or mission requirement, an existing modular system can be used by simply attaching the required modules together for launch. The units in the preferred embodiment all have flyback capabilities, making launches less expensive. The revised orbiters, which do not include the main engines, are less expensive to produce and thus more can be made available, improving transport availability and allowing orbiters to remain in space for longer periods of time without severely restricting launch capacity.

BRIEF DESCRIPTION OF THE DRAWINGS

The present invention will be better understood from the following detailed description o some preferred embodiments of the invention, taken in conjunction with the accompanying drawings in which like reference numerals refer to like parts and in which:

FIG. 3 is a bottom view of the first stage unit, showing the pivot and slide mounting of the two position wing;

FIG. 4 is a cross-section on the lines 4—4 of FIG. 3;

FIG. 5 is an end view of the first stage unit showing the engine arrangement;

FIG. 6 is a perspective view showing one possible configuration of the space system employing a first stage unit, revised orbital vehicle, and wing tank or booster units;

DESCRIPTION OF THE PREFERRED EMBODIMENTS

Figure 1:
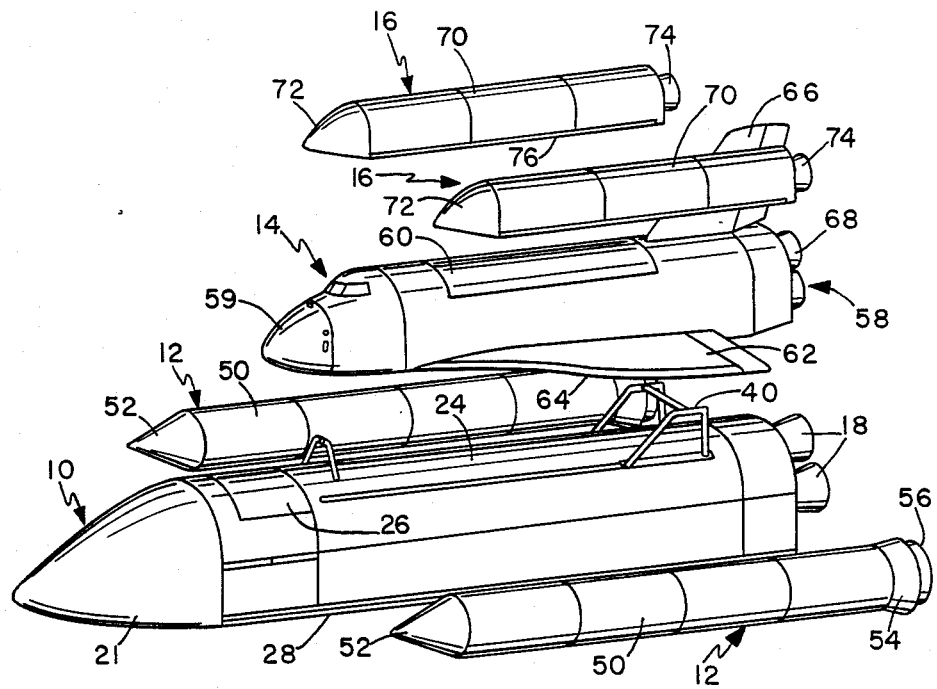
FIG. 1 is an exploded perspective view showing each of several modular components of a multiconfiguration space transportation system according to one embodiment of the present invention.

FIG. 1 is an exploded perspective view showing a number of possible different modular units or vehicles in a multiconfiguration reusable space transportation system according to a preferred embodiment of the present invention. The units are all releasably securable or demountably attachable together in a manner equivalent to that used in the present space shuttle system.

The modular units of the system shown in FIG. 1 include a first stage unit 10, auxiliary propulsion devices comprising solid rocket boosters 12 which are demountably attachable to first stage unit 10, orbital vehicle 14, and another type of auxiliary propulsion device comprising detachable wing tanks or external rockets 16. These modular units are usable in various possible launch and orbital configurations as described in more detail below, according to the required payload and transportation. Another possible modular unit of the system which is not shown in FIG. 1 is a payload canister, which is an unmanned container for holding a payload and which can preferably be demountably attached to the first stage unit in a similar manner to the other vehicles of the system. The payload canister may be provided in various sizes.

Thus each of the modular units can be demountably attached to any of the other units according to the desired launch configuration and payload mass. Each type of modular unit of the system will now be described in more detail.

The first stage unit 10 is a reusable booster rocket which is capable of single-stage-to-orbit operations. It is similar in appearance to the current shuttle system external tank, having an equivalent diameter but being approximately 30% longer than the current external tank. As best seen in FIG. 5, the rear end of the first stage unit 10 accommodates three main engines 18, and two to four additional engines 20. The main body 24 of unit 10 is generally cylindrical, with the forward end 21 being of generally conical shape. Both the main body and conical forward end are covered by a suitable reinforced heat shield to prevent burn-up on descent back to Earth.

In the preferred embodiment the main engines 18 are of a similar type to the current space shuttle main engines provided in the shuttle orbiter. The engines 18 and 20 may utilize any suitable propellant, and the unit 10 has suitable propellant tanks 22 provided in its cylindrical body area 24. The propellant tanks may comprise separate areas for containing liquid oxygen, liquid hydrogen, solid or liquid hydrocarbon fuel, or any other appropriate propellant combination for launching payloads into space. In the preferred arrangement the main engines use liquid hydrogen and oxygen as a propellant, as do the space shuttle main engines supplied from the external tank, and the auxiliary engines 20 are hydrocarbon engines or hydrocarbon oxygen engines. Engines 20 may be of a similar type to the Saturn V F1 engines. F1 engines may be used as is, with appropriate increase in the diameter of unit 10 to accomodate the engines below engines 18, or may be upgraded to higher exhaust pressure. The extra length of unit 10 over the current space shuttle external tank is to accommodate an enlarged liquid oxygen tank and a new hydrocarbon tank.

Preferably, the first stage unit also includes a suitable cargo area 26 which may be arranged to carry freight and/or passengers. The first stage unit may also include a crew compartment (not shown) for manned fly-back operations.

The first stage unit is a recoverable unit which has a pivotal wing arrangement to allow it to return safely back to Earth after launch or other operations are complete.

Figure 2:
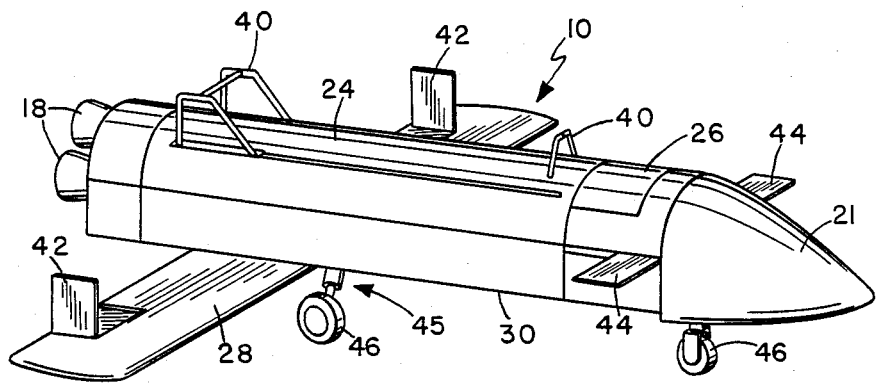
FIG. 2 is a perspective view of the first stage unit of the system of FIG. 1, shown in its return to Earth mode with its wings extended.

The wing arrangement comprises swing wing 28 pivotally attached to the lower face 30 of body 24, which as shown in FIG. 4 is generally flat, by means of pivot mounting 32. The swing wing is rotatable between two positions. During launch, the wing 28 is positioned in alignment with the longitudinal axis of unit 10 as seen in FIGS. 4 and 5 and is flush with the flat base 30 of the body 24. During aerodynamic flight for returning the unit to earth, the wing extends transverse or perpendicular to the unit axis as shown in FIG. 2. This permits the unit to land horizontally.

As can be seen in FIGS. 3 and 4, the wing 28 pivots on mounting 32 about a pivot point or pivot axis 34. The pivot axis is preferably located at or close to the central area of the cylindrical body 24 of the fly back unit 10, and may be movable from this location described below. In the preferred arrangement, the wing is pivotally mounted on a slide plate 36 which is slidable in tracks 38 (see FIG. 4) provided in base 30 to allow the wing to shift along the longitudinal axis of the unit 10 for increased control of center of lift vs. center of drag and mass during reentry. Suitable controls may be provided for shifting the wing longitudinally and locking it in the optimum position. In alternative arrangements, the pivot point may be fixed at all times.

When the wing is to be returned to its positioned aligned with the axis of unit 10, the pivot plate is moved to a central area so that the wing will be properly positioned with its rear end aligned with the rear end of the unit 10. Suitable tracks and straighteners, shown schematically at 39 in FIG. 3, may be provided to engage the wing and support it in position flush with the body of the first stage unit. These straighteners are arranged to prevent or restrict vibration, fluttering and relative rotary movement of the wing during launch and reentry operations.

The first stage unit is preferably compatible with existing attachment points of the space shuttle orbiter, solid rocket boosters, and launch pad. Thus an attachment area 40 serves to connect the upper face of the unit with an orbital vehicle 14, or with other modular units of the system in alternative arrangements described in more detail below. The attachment method is preferably the same as used on the present space shuttle, which is explained in detail in NASA publication SP-407, entitled "Space Shuttle". At the appropriate altitude, as explained in more detail below, the first stage unit 10 will separate from the orbital vehicle or other modular unit and return to Earth, where it can be prepared for future launch. Other attachment areas of a similar nature (not shown in the drawings), are used for demountably attaching solid rocket boosters, external wing tanks or payload canisters at each side of the first stage unit 10 in various possible system configurations.

During entry and slow-down to subsonic, transonic or low-supersonic speeds, the swing wing 28 remains parallel to the vehicle and flush with its base 30. The lateral position of the swing-wing on the body 24 may be adjusted before or during reentry. After reentry, the swing wing can be moved angularly to provide the appropriate aerodynamic lift. It may also be moved angularly during reentry if desired.

Following reentry, the swing-wing moves to the position shown in FIG. 2, generally perpendicular to the longitudinal axis of the first stage unit. Appropriate holding devices (not shown) are included for maintaining the swing wing in this position. The swing wing preferably also includes pop-up rudders or flaps 42 which are hinged near the opposite ends of the wing. Following rotation of the wing to the position shown in FIG. 2, the rudders 42 assume a position perpendicular to the wing. The rudders act to stabilize the aerodynamic cruise and landing flight of the unit 10 and also provide some directional control.

Retractable pop-out canards 44 are also provided towards the forward end of the unit 10. These pop out from their retracted position generally flush with the outer surface of body 24 into the extended position shown in FIG. 2, where they serve to stabilize the reentry flight of the first stage unit.

Also provided on the first stage unit is a retractable landing gear 45 including wheels 46, which are mechanically moved into the projecting position below the base 30 of the first stage unit as shown in FIG. 2 for soft landing. Thus the first stage unit can be landed on a suitable runway area in the manner of conventional aircraft and the shuttle orbiter.

The first stage unit may be constructed to be suitable either for unmanned, automatic piloting, for manned flight, or for selective manned and unmanned flights.

Estimates can be made on the first stage unit (FS) performance based on known performance of the present shuttle system and literature on expected performance of the new hydrocarbon-oxygen engines. Such estimates are shown in Table 1 for an optional first stage unit design. However, alternative designs may be devised.

TABLE 1

| FS WEIGHT ESTIMATES | |
|---|---|
| ITEM | WEIGHT (LBS.) |
| HYDROCARBON (HC-RP1 assumed) | 290,000 |
| OXYGEN FOR HC | 836,000 |
| OXYGEN FOR H-BURN | 1,328,000 |
| HYDROGEN | 221,000 |
| DRY WEIGHTS | — |
| PRESENT EXTERNAL TANK | 69,000 |
| OXYGEN TANK EXTRA | 4,000 |
| HC TANK EXTRA | 8,000 |
| 3 SSMEs | 63,000 |
| HC-0 ENGINES (150 lbs/lbs thrust) | 20,000 |
| THERMAL (BESIDES WING) | 10,000 |
| HYDROGEN RESERVES | 2,000 |
| SWING-WING & ACCESSORIES | 44,000 |
| DRY WEIGHT | 220,000 |
| TOTAL WEIGHT | 2,895,000 |
| LIFT-OFF THRUST | 4,205,000 |
| WEIGHT AT RP BURN-OUT | 1,399,000 |

The first stage unit is designed for use as the first stage or primary booster of a system for launching other units into orbit, or for use independently as a single stage to orbit vehicle. Thus it has sufficient propulsive power for independent launch or for use as a primary booster. The unit has an internal cargo and/or passenger space, and can have external cargo canisters or pods secured to it.

The first stage unit is the core of the multiconfiguration reusable space system of this invention. The other units of the system will now be described in more detail.

The solid rocket boosters 12 are designed to be demountably attached to one or more first stage units for launching heavier payloads into space. The boosters 12 may be of the same general type as used in the current space shuttle. The boosters basically each comprise a cylindrical body 50 having a conical portion 52 at its forward end and frusto-conical section 54 at its rear end where engine 56 is located. The engine s a suitable solid fuel propellant engine and serves to provide booster power during launch. The conical portion 52 of body 50 aids aerodynamic movement through the Earth's atmosphere and also serves as a canister for a landing parachute during return of the booster to Earth. The external surfaces are covered with a suitable heat shield for reentry protection.

The solid rocket booster units 12 are designed to be demountably attached to the first stage unit 10 by the same methods as are used in the present shuttle system. They may be used, for example, when oversize or extra heavy payloads are launched. Once the solid fuel propellant is exhausted, the booster units 12 separate from the first stage unit and fall back to Earth, where they can be recovered and refueled for future use.

In alternative arrangements the solid rocket boosters may be replaced with suitable liquid fuel rockets of equivalent power, for example using liquid hydrocarbons, liquid oxygen and liquid hydrogen, or other suitable liquid fuel propellants. They may also be designed as fly back units with swing wings similar to wing 28 on the first stage unit for controlled flight back to Earth.

The orbital vehicle 14 illustrated in FIG. 1 is of a similar type to the current space shuttle orbiter, but excluding the three main shuttle engines and propellant space now provided in the rear of the shuttle orbiter. The repellent power of the three main engines is provided in this system in the first stage unit, and removal of these engines from the orbital vehicle greatly reduces the weight of the orbiter and leaves a greater volume for additional cargo. The orbital vehicle includes an orbital maneuvering system (OMS) 58 of a similar type to the present shuttle orbiter but with extra propellant for driving the vehicle into orbit.

The external body of the orbital vehicle 14 is very similar to the current shuttle orbiter, including a conical nose section 59 at the forward end which contains the control panels and piloting compartment, cargo area 60 where experiments are carried out, supplies are carried, and instruments are stored, and fixed wings 62. The cargo area is significantly longer than that of a conventional orbiter since the main engines and associated control and propellant space are excluded. Thus the cargo bay is extended to the aft loading doors. The cargo area has upper doors for exposing the area in space, as does the current space shuttle.

Wings 62 have an arcuate outer shape and extend tangentially from the cylindrical body portion of vehicle 14. A carbon-layered forward wing edge 64 runs along wings 62. A split rudder 66 extends upwardly at the rear end portion of the vehicle and is generally perpendicular to the plane of wings 62.

The orbital vehicle may be provided with a pivotal wing in place of fixed wings 62, which may be equivalent to swing wing 28 provided on the first stage unit. Pop out canards may also be provided. The orbital maneuvering system 58 comprises a suitable rocket engine or engines at the rear end of the vehicle which communicate with a nozzle or nozzles 68. The system 65 serves as a maneuvering thruster for vehicle 14 while in orbit or approaching orbit. It need not provide for any of the initial launch propulsion capability, although it may do so in some cases. The OMS may have any suitable propellant stored in tanks at the rear end of the vehicle, such as liquid hydrogen and oxygen. In the preferred arrangement, the OMS is equivalent to that provided on the current shuttle orbiter, but with extra OMS propellant.

The other type of modular unit shown in FIG. 1 is a different type of auxiliary unit comprising a wing tank or external rocket 16. In the arrangement shown in FIG. 1, a pair of these auxiliary units 16 are shown for demountably attaching to the wings of the orbital vehicle 14. However, they may alternatively be attached in a similar fashion to the first stage unit, as will be described in more detail below. The external Centaur units are preferably liquid hydrogen and oxygen rockets which are primarily intended to attach to the payload but may have propellant cross-feeds from the first stage unit 10. The auxiliary unit may be of a similar type to the Centaur launch vehicle but of sufficient structural strength for external attachment during launch.

The external rocket or wing tank unit 16 is similar in appearance to the solid rocket booster 12 but is shorter and of much less weight than the booster 12. In the preferred arrangement they are 1/20th the dry weight of booster 12 and are intended to operate primarily from high altitude to space or as deep space boosters or supply vehicles. The units 16 have a swing wing 76, which can be seen in FIG. 1. Wing 76 is similar to wing 28 on the first stage unit for controlled descent of the vehicle on return to Earth. They may also have pop-out canards for additional control. Once the fuel is exhausted, the units can return from orbit or deep space by aerobraking, and then fly to a landing field in an equivalent manner to the first stage unit, as described above in connection with FIGS. 2 and 3.

The external unit 16 has a generally cylindrical main body section 70 with a conical nose section 72 at its forward end and engine nozzle or nozzles 74 projecting from its rear end. The cross sectional configuration of external unit 16 will be generally the same as that of the first stage unit 10 as shown in FIG. 4. The interior of unit 16 contains a tank or separate tanks containing an adequate supply of propellant. The external unit may also be equipped with an aircraft and/or small jet engine for enabling the vehicle to cruise to a landing field for landing following reentry. They may use multiple RL-10s for propulsion and systems from cruise missiles for airborne navigation, and preferably have an auto pilot system so that they can fly automatically under remote control between launch sites. Any suitable propellant and engine may be used for boosting and landing operations. The unit will have a suitable protective heat shield for reentry.

Upon separation from an orbital vehicle, first stage unit, or other payload container, the external units or wing tanks use their rocket engines to reenter Earth orbit. They will then rotate their wings perpendicular to body 70, and glide or cruise for a safe horizontal landing on Earth. Units 16 may also include pop-up flaps, canards, and landing gear equivalent to that provided on the first stage unit 10 described above in connection with FIGS. 2 to 5. The external units 16 may also perform independent missions in space, act as supply and tug vehicles for manned and unmanned facilities throughout cis-Lunar space, and they may be staged.

In one potential embodiment the external or wing tank unit is scaled to contain 80,000 lbs of propellant and is estimated to have a dry weight of approximately 9,000 lbs, comprising 4,300 lbs propellant tankage, 1,000 lbs thermal and cryogenic insulation, 400 lbs go-around reserves and 1,800 lbs swing-wing and accessories. The unit is not designed to take primary loads during ascent, and thus the structural weight may be low.

Figure 9:
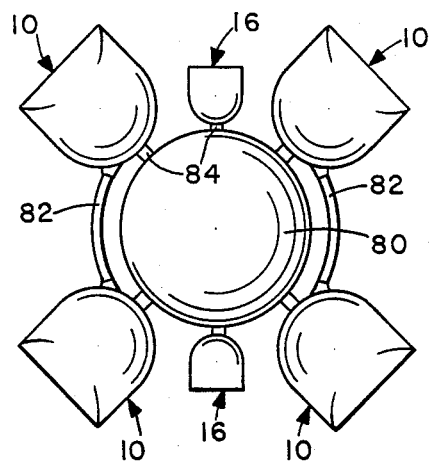
FIG. 9 is a top plan view of another configuration of the space transportation system in which a parallel arrangement of first stage units is used to launch a payload canister into space.
Figure 10:
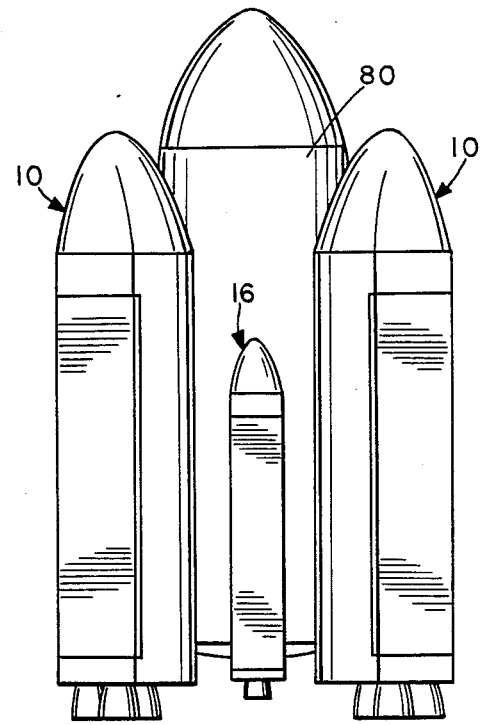
FIG. 10 is a side elevational view of the configuration of FIG. 9.

Another optional modular unit of the system, which is not shown in FIG. 1, is a payload unit or canister which comprises a simple unpowered container for holding cargo to be launched into orbit or supplied to an orbiting vehicle or space station. Such a unit is demountably attachable to the first stage unit in an equivalent manner to the orbital vehicle 14. The payload units are suitably provided in various different sizes for different mass and weight payloads. A suitable payload unit 80 is illustrated in FIGS. 9 and 10, described in more detail below.

The various units of the modular multiconfiguration system can be optionally secured together in various different launch configurations according to the payload weight and particular mission characteristics, i.e. launch to orbit, launch to deep space, extended flights, space station operations, and so on. Some of the various possible system combinations are summarized in the table below, where FS refers to the first stage unit 10, SRB refers to the solid rocket booster 12, RO refers to the orbital vehicle 14, and AU refers to the auxiliary external propulsion unit 16. Also included in Table 2 are estimated payload capacities calculated for a first stage unit of approximately 4,205,000 lbs lift-off thrust.

TABLE 2

| SYSTEM COMBINATIONS | |
|---|---|
| | Approx. payload (tons) |
| 1. FS (as single-stage-to-orbit) | ~50 |
| 2. FS + SRBs | >50 |
| 3. FS + AU (FIG. 11) | ~100 |
| 4. FS + SRBs + AUs | >100 |
| 5. FS + AUs + RO (FIG. 6) | ~50 |

TABLE 2-continued
SYSTEM COMBINATIONS

| | Approx. payload (tons) |
|---|---|
| 6. Parallel FSs + AUs (FIG. 10) | As large as needed |
| 7. FS (as first stage) + RO (FIG. 12) | ~20–30 |

These possible combinations will now be described in more detail with reference to the drawings. FIG. 6 shows a launch combination comprising the first stage unit 10, orbital vehicle 14, and two external or wing tank units demountably attached to the lower faces of wings 62 of orbital vehicle 14.

In the arrangement illustrated in FIG. 6, the FS is intended to supply propellants to the auxiliary units (AUs) during launch by suitable propellant lines (not shown) and will separate from the orbital vehicle and AUs at a few thousand feet per second short of orbit. Following separation, the FS will fly back to the launch site as described above. The orbiter and wing tanks or AUs will then proceed to low Earth orbit. Calculations indicate that the orbital vehicle and two external wing tanks could achieve orbit with 100,000 lbs of payload and a total of approximately 40,000 lbs of propellant in the two wing tanks. Propellant could be transferred from one wing tank to the other. The wing tanks could be staged and returned to Earth when empty to be prepared for reuse.

A similar configuration to that of FIG. 6 for higher payload orbital vehicles is shown in FIG. 1, where added boost is provided by a pair of solid rocket boosters 12 secured to opposite sides of the first stage unit 10. This allows much heavier orbiter payloads to be launched into orbit. At launch of this arrangement, the first stage unit 10 and boosters 12 provide primary boost thrust for approximately two minutes. When the booster fuel is exhausted, boosters 12 separate from unit 10 and either fall back to Earth utilizing parachutes or fly back if they are provided with swing wings similar to wing 28 of the first stage units. They can then be recovered for refurbishment, refueling, and reuse. In place of boosters 12, additional units 16 of the wing tank type may be secured to first stage unit to provide boost in a similar fashion.

The first stage unit and its three main engines continue to provide thrust until the propellants are exhausted. Propellants are supplied from suitable tanks within the unit to the engines during launch and travel of the system to close to orbital velocity. A small propellant reserve (approximately 10,000 to 20,000 lbs) is preferably left in the unit 10 after separation from the orbital vehicle. Excess propellant may be transferred to the external wing tank units 16, for example during or after launch.

The first stage unit separates from the orbital vehicle at a lower inertial velocity than in the corresponding operation of separation of the external tank from the orbiter in the current shuttle system. The unit 10 separates close enough to orbital velocity and altitude to enable the wing tanks 16 or enhanced orbital maneuvering system of the orbital vehicle to propel the vehicle into orbit.

Figure 8:
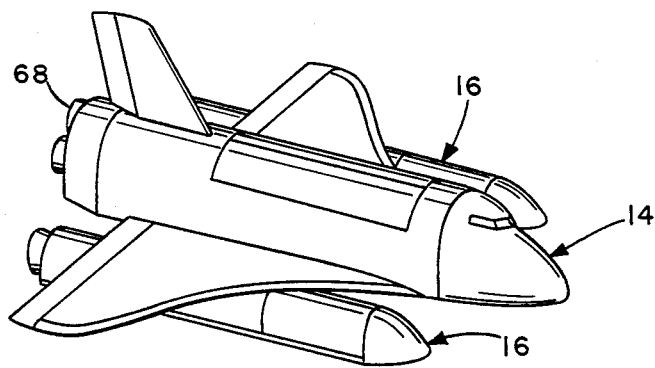
FIG. 8 is a perspective view of another possible configuration suitable for orbit or boosting to deep space, comprising a revised orbital vehicle and booster units or wing tanks.

The first stage unit then reenters the atmosphere, decelerates to sub-sonic speed, and rotates its swing wing into the fully extended position shown in FIG. 2. The orbital vehicle and external wing tank or auxiliary units proceed into orbit or deep space in the configuration shown in FIG. 8. The pivot axis of the swing wing may be moved along the longitudinal axis of the unit 10 before and during reentry and during the transition to atmospheric flight. Movement of the pivot point helps to control the relative and absolute location of the centers of lift and gravity (and to some extent drag) of the first stage unit. When the wing is extended, the unit 10 flies back to the launch area or an alternative landing site, and lands like a conventional aircraft. The pop-up rudders and pop-out canards may be used to control and stabilize the flight and landing. Reaction control jets or other conventional stabilizing means may alternatively or additionally be incorporated in unit 10. Jet engines are provided in the aft propulsion system adequate to establish thrust for level cruising during the return portion of the flight, and to provide adequate safety margins, for example for climbing and go-arounds in landing.

Following separation of the orbital vehicle and external wing tank units, the units 16 provide thrust to boost the orbital vehicle into orbit. On achieving the final or transitional trajectory, the wing tank unit engines are shut down. Any excess propellant may be transferred into a single one of the units 16, with the other unit separating for return to Earth. The separated unit will retain sufficient fuel for firing its engines for de-orbit, reentry, flight and landing at a chosen landing site. The remaining excess fuel will power small internal jet engines in atmospheric flight.

The remaining unit may be used to change the trajectory, to move payloads extracted from the orbital vehicle to a different trajectory, to provide propellant to the orbital vehicle for running life support and water systems, and for other uses.

The wing tank or external rocket units are usable not only during transport to orbit operations, but additionally to transport small cargos and/or propellant from Earth to users in space or to return cargos to Earth from space, or to move cargo or propellants from one facility to another in space (e.g. from a low earth orbit space station to a GEO satellite). Cargo spaces for this purpose may be provided in the body section of the wing tank unit. The units 16 may also be designed to take cargo out of the orbital vehicle cargo bay, for example by hooking it to their nose section, and to transport it to another location. This may be particularly useful for construction of space stations and the like.

Additionally, fully fueled wing tank units may be provided in Earth orbit to attach to the orbital vehicle after launch. One, two, three or four such units may be attached to a single orbital vehicle in space to provide a fully loaded orbital vehicle with approximately 4,000, 8,000 or 12,000 feet per second velocity out of low Earth orbit. Thus the orbital vehicle combined with various reusable wing tank units can provide economical access to deep space. Most of the critical orbital vehicle consumables can be extended by using propellant from the attached wing tanks or by utilizing the enlarged cargo capacity of the vehicle resulting from the removal of the main engines. Thus much longer orbital missions or deep space missions can be accomplished. The auxiliary unit or wing tank may in alternative embodiments comprise a simple external propellant tank with no engine for supplying propellant to the orbiter OMS or other internal systems.

The external units or wing tanks can serve as resupply carriers between an orbital vehicle and space station or Earth base, for example, and thus make possible space missions of indefinite duration.

Figure 7:
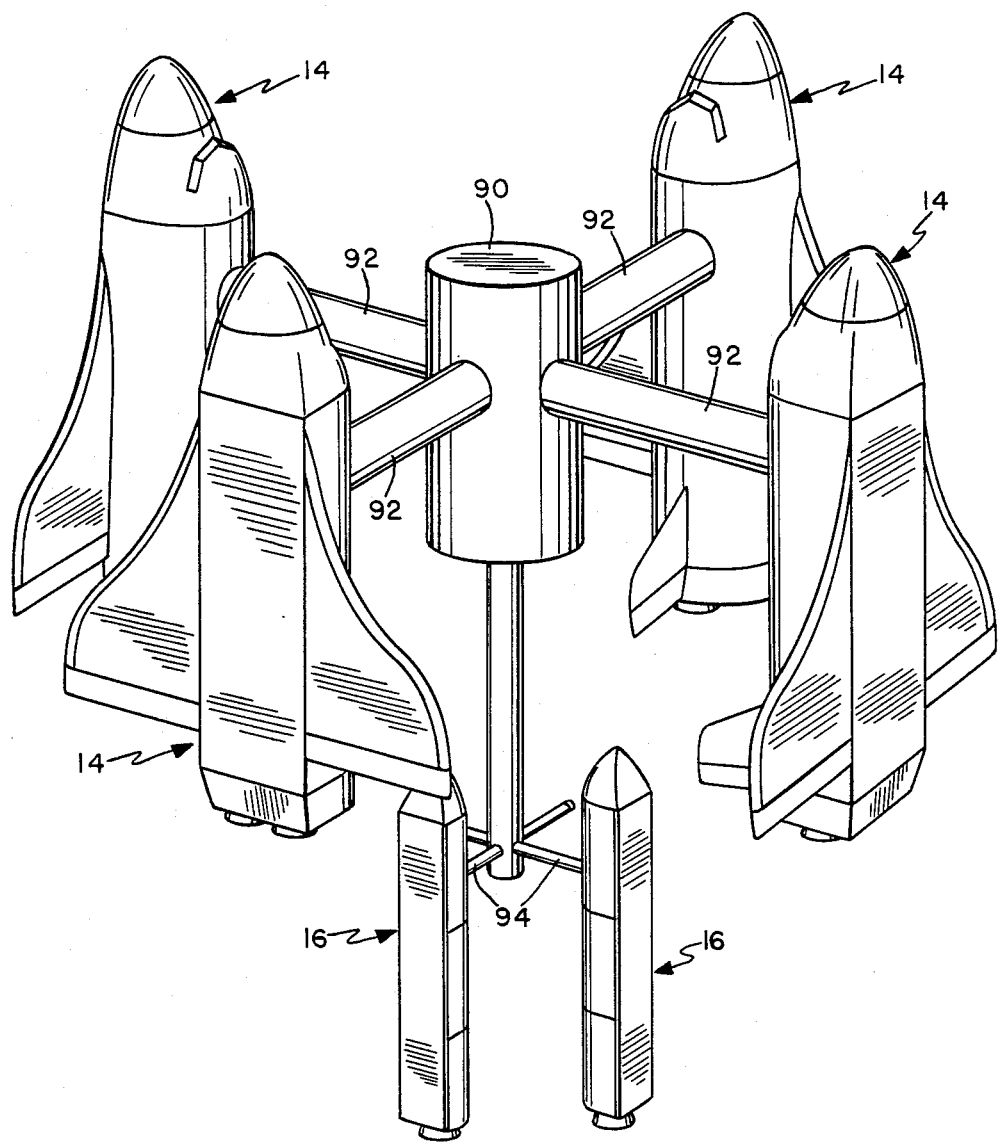
FIG. 7 is a perspective view showing another possible configuration of the system in which several types of orbital vehicles form a temporary space station in deep space.

FIG. 7 shows a readily modifiable space station employing these modular units. The station includes a linkage and service module 90 having four equally spaced cylindrical arms 92 projecting from its upper body portion. These arms 92 have docking areas for orbital vehicles 14 and serve as a passageway from the vehicles 14 to the service module 90. Four similar arms 94 projecting from the lower end of service module 90 have docking facilities for the external Centaur or wing tank units 16 and may be connected to the units 16 for refilling them with propellants or for deequipping them for other purposes.

In operation, the wing tank units attached to an orbital vehicle act as tugs or upper stage propulsion units for properly positioning the vehicle at arms or passageways 92. The units may then be moved to the lower arms 94 for refueling or reequipping. The orbital vehicle or vehicles 14 may thus be relaunched from a station of the type illustrated in FIG. 7 to proceed to deep space or return to Earth, for example. The orbital vehicles may have swing wings in or wing tank place of the fixed wings shown.

When the external or wing tank units are to return to Earth, they travel in orbit until they reach the appropriate point to perform a de-orbit burn, using either their main engine or smaller reaction control engines. The unit then reenters and uses rotation and repositioning of the swing wing 76 (see FIG. 1) to permit subsonic atmospheric flight. Power may be provided by a suitable small cruise engine provided on board the external unit. The unit can then fly to an appropriate base and land. Alternatively, the unit may simply glide to a landing site as does the current shuttle.

Another potential launch configuration comprises a single first stage unit acting as a single stage to orbit vehicle. This can be used to launch an internal payload into orbit, for example, in a stretched inner tank region, or to carry externally attached cargo pods into orbit. The first stage unit having three space shuttle main engines as well as two to four liquid oxygen/hydrocarbon engines, is designed to have sufficient thrust to achieve earth orbit with a payload mass of approximately 50 tons. The additional engines may, for example, be two F1 type engines similar to those used for the Saturn V rocket, or similar engines upgraded to higher exhaust pressure. The additional engines can be designed so that the main engines need not be pushed to more than 95% of their rated thrust, greatly extending operating life. Once the propellant tankage of unit 10 is removed from booster service, generally after ten to twenty missions, it may be recycled as an expendable payload canister.

In a typical launch, the main engines and HC-O engines would both be operated from launch to the altitude reached 120 seconds into the flight. At this point HC-0 thrust will be terminated. The remaining H-0 propellant powering the main engines is calculated to be more than sufficient to achieve low earth orbit at 28,300 feet per second. The first stage unit could dock at a space station, if required, in a manner such as illustrated in FIG. 7 in place of the orbital vehicle. Thus it could supply cargo or transport passengers.

Although the first stage unit is described in the preferred embodiment as having a swing wing for optimal vertical launch and horizontal fly back operations, it may alternatively be provided with a single fixed wing in alternative arrangements, in the manner of the orbital vehicle. However, fixed wings place stresses on the unit during launch and reentry, require additional insulation, and are generally not optimized for efficient low speed flight in the atmosphere.

Although in the preferred embodiment the first stage unit has three main engines having a suitable propellant such as liquid hydrogen and oxygen, and two to four dual fuel auxiliary engines such as HC-O engines, any alternative engines and propellants for supplying the required thrust may be used. As mentioned above, propellant for the engines is stored in suitable tanks within the body 24 of the unit 10. Thus many small engines may be used in place of the three main engines and/or the two to four auxiliary engines.

An arrangement for launching relatively heavy payloads into orbit is illustrated in FIGS. 9 and 10. In this arrangement a parallel cluster of four first stage units is used to launch and transport a single massive payload canister 80. This type of system can be operated as a multistage vehicle to boost very large payloads. Propellant cross-feeds 82 may be provided between the first stage units as is done in the current shuttle system. The arrangement shown in FIG. 9 and 10 may also include two or more external auxiliary power units 16 for additional boost power. All of these units are suitably demountably attached to the payload canister 80 by mounting devices shown schematically at 84. Canister 80 is suitably in the form of a cylindrical body having a generally conical nose portion.

Figure 11:
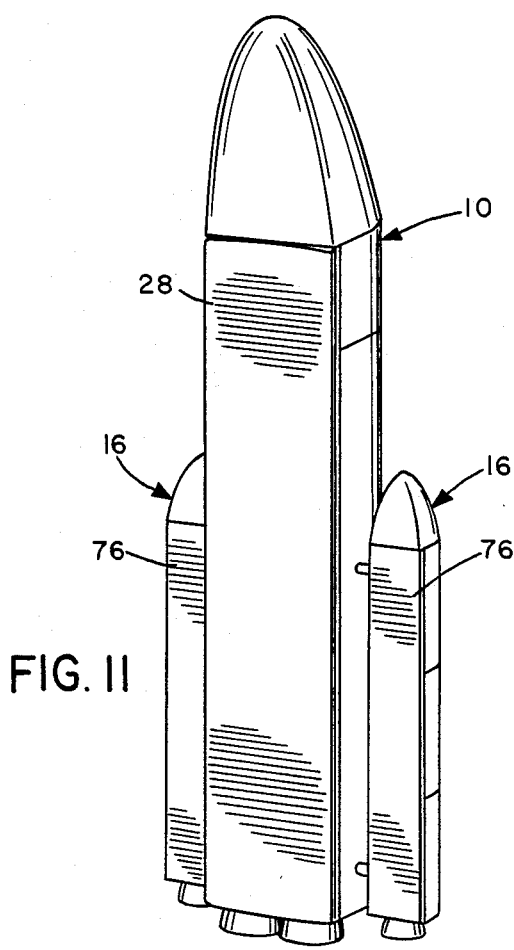
FIG. 11 is a perspective view of another possible launch configuration of the space system employing a single first stage unit and booster units.

FIG. 11 illustrates another potential launch arrangement using a first stage unit 10 and two external auxiliary power units 16. With this arrangement a first stage unit carrying a heavier payload can be launched into low Earth orbit, for example. The first stage and auxiliary units utilize their swing wings 28 and 76, respectively for return to Earth.

Figure 12:
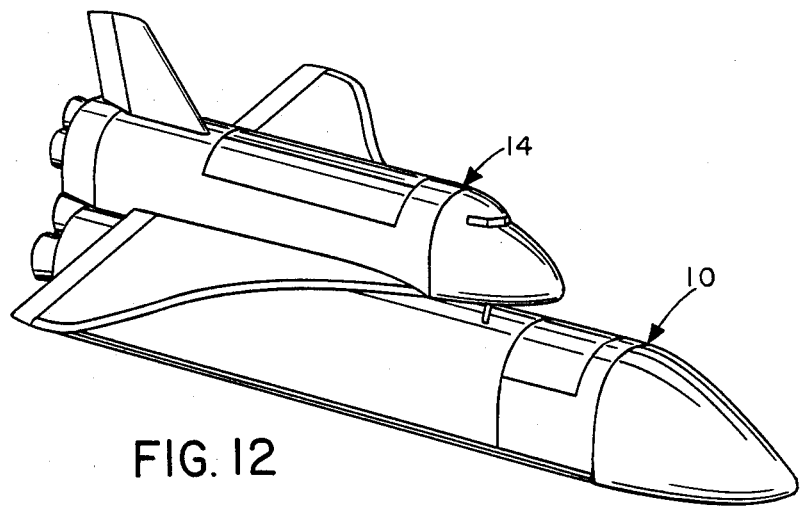
FIG. 12 is a perspective view of a further possible launch configuration comprising a first stage unit and revised orbital vehicle.

Finally, FIG. 12 illustrates a launch arrangement in which a single first stage unit 10 is used to launch an orbital vehicle 14 close to orbital velocity and altitude before returning to Earth. The orbital vehicle uses its enhanced orbital maneuvering system (OMS) power to boost into low earth orbit. This can be achieved by increasing current shuttle OMS propellant by approximately 110,000 lbs and thus the thrust of the OMS system by a factor of 5 to 8.

Thus the first stage unit 10 which forms the core of a multiconfiguration, modular and reusable space transportation system is usable both as an orbital vehicle per se and as a first stage booster to launch other payloads into or close to Earth orbit. The modified orbital vehicle carries less non-payload mass into orbit than the present space shuttle system, and has a longer cargo bay. The orbital vehicle will have top cargo bay doors designed to swing open to allow experiments to be exposed during orbit, and to allow payloads to be extracted or placed in the cargo bay, and may have additional doors in the aft section of the cargo bay to provide access without opening the top cargo bay doors. It should be possible to accommodate fifteen to thirty foot longer payloads than in the present shuttle system. The shuttle body may be made completely tubular for improved strength. Since the dry weight of the orbital vehicle is much less and the aft cargo extension will create a low aerodynamic drag profile, the orbiter without payload should be a reasonably good aircraft. Detachable jet engines may be mountable on the wings and powered by hydrocarbon or hydrogen fuel stored in tanks in the cargo bay to permit operation of the vehicle as an aircraft. This greatly simplifies redeployment of orbital vehicles from one launch site to another.

The external auxiliary power or wing tank units may be secured when necessary to provide additional boost and maneuvering power to either an orbital vehicle or a first stage unit, while occupying no cargo bay space. They pose fewer hazards than if they were located internally in the orbital vehicle. The modular system also employs optional solid rocket boosters for added launch thrust.

Every modular unit of the system described above can be recovered on return to Earth for use in future missions, reducing costs and improving turnaround time. The units can be selected for a particular mission and suitably demountably secured together in the desired configuration. Because of the flexibility of this system, only a finite number of different types of modular units is required to support a wide variety of different operations, including launching of payloads from 20 to 30 tons up to over 100 tons, manned and unmanned flights, in-space transportation from site to site, missions to deep space, space station support, and many other potential missions.

Thus, instead of having to redesign a space vehicle for each new mission, the appropriate modular units for supporting the mission are simply chosen from existing stock and connected together in the desired launch configuration. This makes space missions significantly less costly. Each unit of the modular system is capable of various uses, such as the first stage unit which can act either as a first stage booster or as a single stage to orbit vehicle, and the external auxiliary power units which can act as boosters during launch, orbital transportation or maneuvering vehicles, or external engines on an orbiting vehicle, for example. Since the orbital vehicles are much simpler and less expensive than existing orbiters, it is possible that a larger fleet may be available and may be supported by a lesser number of first stage units which return to Earth after each launch for preparation to launch another orbital vehicle or other types of payload.

The system may be configured as a single stage to orbit system, a two stage system (first stage unit plus auxiliary units or SRBs), a three stage system (FS plus auxiliary unit plus SRB) and so on. The swing wing provides the aerodynamic capability for controlled flight of the first stage and auxiliary units back to Earth, while being retractable into alignment with those units so that it does not interfere with the vertical launch configuration.

Although some preferred embodiments of the present invention have been described above by way of example, it will be understood by those skilled in the field that modifications may be made to the described embodiment without departing from the scope of the invention, which is defined by the appended claims.

I claim:

1. A multi-configuration transportation system for selectively transporting different mass payloads into space, comprising:
   a plurality of different modules releaseably securable together into a plurality of different possible launch configurations, the modules including:
   a first stage unit containing primary propulsion means for providing thrust to said system for launching payloads up to a predetermined mass to a predetermined altitude and velocity, the first stage unit including aerodynamic means for controlling the guided descent of said first stage unit to Earth after launch;
   at least one auxiliary unit selectively securable to the other modules in said system, the auxiliary unit containing secondary propulsion means for carrying payloads larger than said predetermined mass into orbit;
   the modules including payload carrying means for carrying payloads larger than said predetermined mass into orbit;
   the aerodynamic means comprising a wing having a pivotal mounting for pivotally securing said wing to said first stage unit for rotating between a first position in alignment with the longitudinal axis of said first stage unit and a second position perpendicular to said longitudinal axis, said wing having retractable wing flaps adjacent each end, the wing flaps being moveable between a retracted position flush with said wing and an extended position extending perpendicular to said wing for assisting in directional control of the descent of said first stage unit.

2. A multi-configuration transportation system for selectively transporting a range of different mass and volume payloads into space and for conducting operations in space, comprising:
   a plurality of different, generally cylindrical modules releasably securable together in a plurality of different possible launch configurations and space operation configurations;
   the modules including:
   a first stage unit containing primary propulsion means for providing thrust to said system for launching payloads up to a predetermined mass and volume to a predetermined altitude and velocity, the first stage unit including aerodynamic means for controlling the guided descent of said first stage unit to Earth after launch;
   at least one auxiliary propulsion unit selectively securable to the other modules in said system, the auxiliary propulsion unit containing secondary propulsion means for carrying payloads larger than said predetermined mass into orbit; and
   at least one unpowered cargo container selectively and releasably securable externally to said first stage unit, the container having internal cargo space for carrying cargo.

3. The system according to claim 1, wherein said first stage unit has internal payload space for carrying payload for transportation into space.

4. The system according to claim 1, wherein said modules further include an orbital vehicle having propulsion means for orbital maneuvering and internal cargo space for carrying a payload, said modules being capable of connection and separation in space and of space operations.

5. The system according to claim 1, wherein said first stage unit has sufficient thrust for selectively using said first stage unit independently as a single stage to orbit vehicle or as a first stage booster with other selected modules of the system.

6. The system according to claim 1, wherein all of the modules have aerodynamic means for flying back to Earth.

7. The system according to claim 1, wherein said first stage unit has three main engines and at least two additional engines.

8. The system according to claim 7, wherein said three main engines are liquid oxygen-hydrogen engines.

9. The system according to claim 7, wherein the additional engines are liquid oxygen-hydrocarbon engines.

10. The system according to claim 7, wherein the additional engines are hydrocarbon engines.

11. The system according to claim 1, wherein the auxiliary unit comprises solid rocket boosters demountably securable to the first stage unit.

12. The system according to claim 2, wherein the auxiliary unit comprises an external rocket demountably attachable to the orbit vehicle or to the first stage unit.

13. The system according to claim 1, including a payload carrying unit, the auxiliary unit comprising a rocket demountably attachable to the payload carrying unit.

14. The system according to claim 1, wherein the auxiliary unit includes aerodynamic means for controlled return to Earth.

15. The system according to claim 1, wherein said first stage unit comprises an elongate, generally cylindrical body and said aerodynamic means comprises a wing secured to said body.

16. The system according to claim 15, including a pivotal mounting for pivotally securing said wing to said first stage unit for rotation between a first position in alignment with the longitudinal axis of said first stage unit and a second position perpendicular to said longitudinal axis.

17. The system according to claim 16, including slide means for sliding said pivot mounting along the length of said first stage unit for changing the position of said wing.

18. The system according to claim 16, wherein said first stage unit has independently mounted, retractable canards on opposite sides of its exterior surface which are moveable between a retracted position flush with the surface of said unit and an extended position projecting outwardly from the surface of said unit.

19. The system according to claim 1, in which each of the units is selectably securable to other units in various possible launch configurations, the configurations including a single first stage unit releasably secured to a pair of auxiliary units.

20. The system according to claim 1, in which the modules include payload carrying units of various different sizes, and each of the units is selectably securable to other units in various possible launch configurations.

21. The system according to claim 20, in which the configuration include a single first stage unit having an internal payload volume for carrying cargo or extra propellant.

22. The system according to claim 20, in which the configurations include a single first stage unit secured to an external payload carrying unit.

23. The system according to claim 20, wherein the payload carrying unit comprises an orbital vehicle having an orbital maneuvering system for manned flight.

24. The system according to claim 20, in which the payload carrying unit comprises a canister for containing a payload for unmanned flight.

25. The system according to claim 20, in which the possible configurations include an array of several parallel first stage units secured to a payload carrying unit.

26. The system according to claim 25, in which the configuration includes at least two auxiliary units secured to the payload carrying unit.

27. The system according to claim 20, in which the possible configurations include a first stage unit having two second stage units secured on opposite sides, a payload carrying unit demountably secured to the first stage unit, and additional auxiliary units secured to the payload carrying unit.

28. The system according to claim 27, wherein propellant feed lines are provided between the first stage and auxiliary units.

29. The system according to claim 27, wherein the auxiliary units are of two different types, the first type comprising a solid fuel rocket and the second type comprising a liquid fuel rocket.

30. A multi-configuration reusable space transportation system, comprising a plurality of modules selectably securable together in a variety of different possible configurations, the modules including:
a first stage unit including primary propulsion means for boosting payloads up to a predetermined mass to a predetermined altitude and velocity; and an unpowered cargo carrying unit demountably and externally attachable to the first stage unit;
the first stage unit propulsion means comprising means for boosting the first stage unit as a single-stage-to-orbit vehicle into orbit or for providing boost power to thrust a payload carrying unit secured to the first stage unit into or close to orbit, the first stage unit selectably acting as an independent, single-stage-to-orbit vehicle or as one stage of a multiple stage to orbit configuration;
the first stage unit including aerodynamic means for controlled return to Earth.

31. A multi-configuration space transportation system comprising a plurality of different modules selectively securable together in a variety of different possible launch and space operation configurations for selectively transporting a range of different mass and volume payloads into space and for conducting operations in space, the modules including:
an unpowered, cargo carrying unit for containing a cargo to be transported into space;
a generally cylindrical first stage unit demountably and externally attachable to said cargo carrying unit and containing primary propulsion means for assisting said cargo carrying unit to achieve orbit; and
aerodynamic means attached to said first stage unit for controlling descent of said first stage unit to Earth, said aerodynamic means comprising:
a monolithic swing wing and pivotal mounting means for pivotally securing said swing wing to said first stage unit for rotation between a first position flush with the body of the first stage unit and aligned with the longitudinal axis of the first stage unit and a second position transverse to said longitudinal axis, the pivotal mounting means being located generally at the center of said swing wing.

32. The system according to claim 31, including an auxiliary unit for externally releasably connecting to said payload carrying unit having auxiliary propulsion means for supplying additional power to said unit, the auxiliary unit including aerodynamic means for controlled descent to Earth on separation from said auxiliary unit.

33. The system according to claim 32, wherein said aerodynamic means of said auxiliary unit comprises a swing wing pivotally attached to said auxiliary unit for rotation between a first position aligned with the longitudinal axis of said unit and a second position transverse to said axis.

34. The system according to claim 31, wherein the wing is an elongate, straight wing of approximately the same length as the first stage unit.

35. The system according to claim 31, wherein all of the units have aerodynamic means for controlling the guided descent of the units to Earth.

36. The system according to claim 31, wherein said aerodynamic means includes canards mounted on said first stage unit remote from said swing wing, said canards being movable between a first position flush with the surface of said first stage unit and a second position projecting outwardly from said first stage unit for directional control of said unit.

37. A multi-configuration space transportation system comprising a plurality of modules selectively securable together in a variety of different possible launch configurations, the modules including:

a payload carrying unit for containing a payload to be transported into space;

a first stage unit demountably attachable to said payload carrying unit and containing primary propulsion means for assisting said payload carrying unit to achieve orbit; and aerodynamic means attached to said first stage unit for controlling descent of said first stage unit to Earth, said aerodynamic means comprising:

a monolithic swing wing and pivotal mounting means for pivotally securing said swing wing to said first stage unit for rotation between a first position flush with the longitudinal axis of the first stage unit and a second position transverse to said longitudinal axis, the pivotal mounting means being located generally at the center of said swing wing, and further including rudder means fastened to opposite ends of said swing wing, said rudder means being movable between a first position flush with the first surface of said wing and a second position perpendicular with said wing for assisting in directional control of the descent of said first stage unit.

38. A multi-configuration transportation system for selectively transporting different mass and volume payloads into space and for conducting operations in space comprising:

a plurality of different, generally cylindrical modules releasably securable together in a plurality of different possible launch and in-space operation configurations;

the modules including:

a first unit containing primary propulsion means for providing thrust to said system for launching payloads of a predetermined mass and volume to a predetermined altitude and velocity, the first stage unit including aerodynamic means for controlling the guided descent of said first stage unit to Earth after launch;

at least one auxiliary unit selectively securable to the other modules in said system, the auxiliary unit containing secondary propulsion means for addition to said primary propulsion means to carry payloads larger than said predetermined mass into orbit; and at least one unpowered payload container selectively and releasably securable externally to said first stage unit, the payload container having an internal space for carrying payload;

said first stage unit being selectively operable as an independent, single stage to orbit vehicle, the unit having internal cargo space for carrying a payload, and as a first stage booster with other selected modules of said system;

said first stage unit having a plurality of releasable connecting means for selectively connecting and disconnecting any of said modules with said first stage unit on Earth, in flight and in space.

* * * * *

UNITED STATES PATENT AND TRADEMARK OFFICE
CERTIFICATE OF CORRECTION

PATENT NO. : 4,834,324
DATED : May 30, 1989
INVENTOR(S) : David R. Criswell

It is certified that error appears in the above-identified patent and that said Letters Patent is hereby corrected as shown below:

Column 17, line 10 (Claim 12), "2" should be --3--;

and line 12, (Claim 12), "orbit" should be --orbital--.

Signed and Sealed this

Nineteenth Day of November, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,834,324

DATED : May 30, 1989

INVENTOR(S) : David R. Criswell

It is certified that error appears in the above-identified patent and that said Letters Patent is hereby corrected as shown below:

Column 16, Claim 3, line 49, "1" should be --2--;

Column 16, Claim 4, line 52, "1" should be --2--;

Column 16, Claim 5, line 58, "1" should be --2--;

Column 16, Claim 6, line 63, "1" should be --2--;

Column 16, Claim 7, line 66, "1" should be --2--;

Column 17, Claim 11, line 7, "1" should be --2--;

Column 17, Claim 13, line 13, "1" should be --2--;

Column 17, Claim 14, line 17, "1" should be --2--;

Column 17, Claim 15, line 20, "1" should be --2--;

Column 17, Claim 19, line 41, "1" should be --2--; and

Column 17, Claim 20, line 46, "1" should be --2--.

Signed and Sealed this

Second Day of March, 1993

*Attest:*

STEPHEN G. KUNIN

*Attesting Officer*   *Acting Commissioner of Patents and Trademarks*